Oct. 22, 1935. J. HEDDON Re. 19,734
METHOD OF DRAINING TUBES
Original Filed Dec. 29, 1933
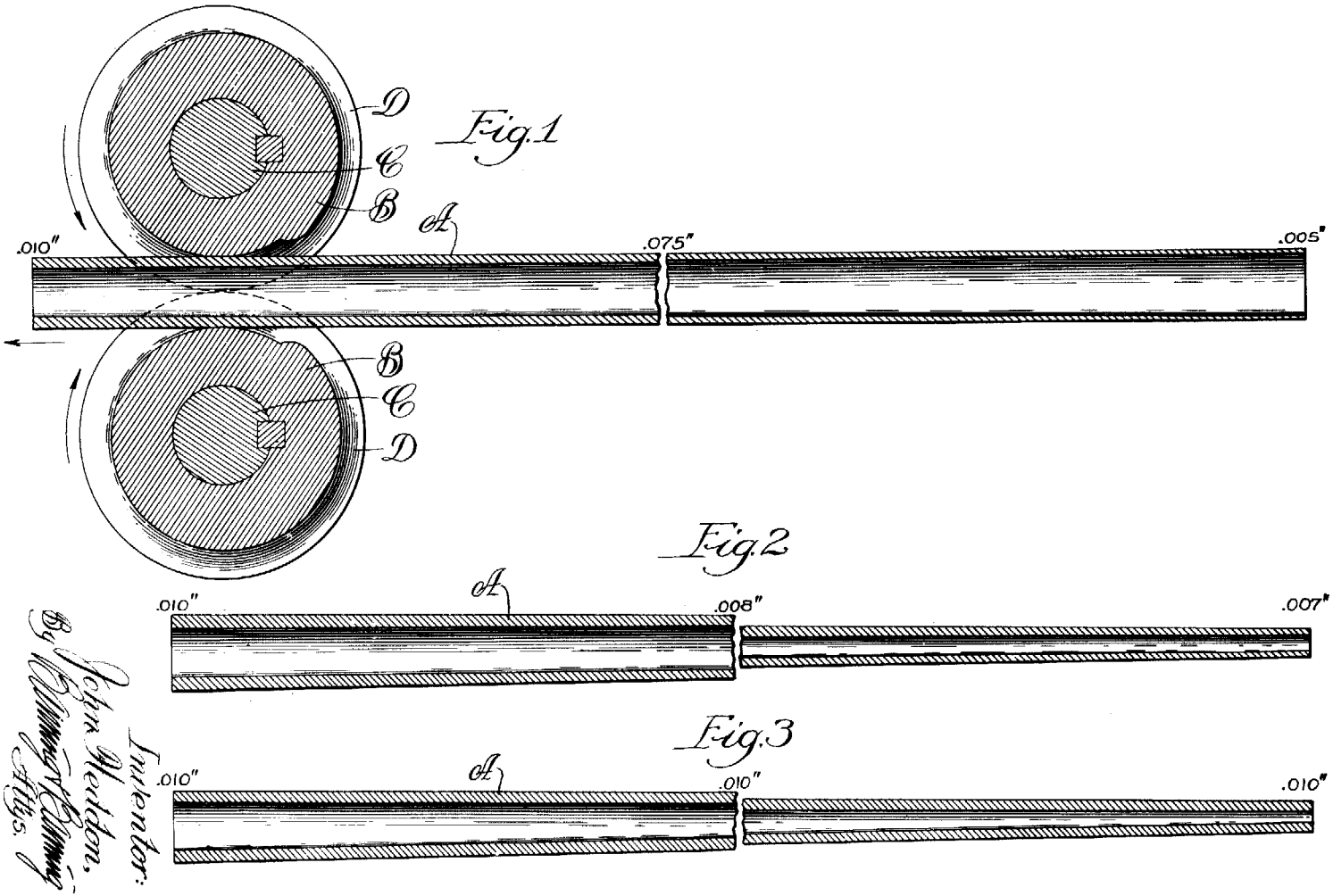
Inventor:
John Heddon,
By Bunning & Bunning
Attys.

Reissued Oct. 22, 1935 Re. 19,734

UNITED STATES PATENT OFFICE 19,734

METHOD OF DRAWING TUBES

John Heddon, Dowagiac, Mich., assignor to James Heddon's Sons, Dowagiac, Mich., a corporation of Michigan Original No. 1,993,883, dated March 12, 1935, Serial No. 704,375, December 29, 1933. Application for reissue May 2, 1935, Serial No. 19,481

3 Claims. (Cl. 80—62)

The method of the present invention is designed primarily to meet the requirements in the tapering of drawn tubular fishing rods, although the principles involved are applicable to the drawing of tubular steel golf shafts or the like, or other shafts in which it is desirable to produce a tubular shaft having a certain predemined ratio between wall thickness and taper, and particularly in cases in which it is essential in the tapered product that the wall thickness at the end of lesser diameter shall not be in excess of the wall thickness at the end of greater diameter.

The taper drawing of a tube has the effect of redistributing the metal and crowding it toward the end of lesser diameter, with the result that during the tapering operation the thickness of the walls of the tube will be progressively increased as the external diameter of the tube is progressively decreased, with the result that if the intended product, such for instance as a fishing rod, is drawn from a tube of uniform diameter and uniform wall thickness, the completed rod or the like will progressively increase in wall thickness toward the tip end, so that the ratio of weight to diameter will be greater in the tip of the rod than in the butt of the rod, which is objectionable in the designing of certain types of fishing rods, and particularly in the designing of light rods intended for fly casting.

In the case of a fly casting rod, or other rods in which the question of balance or "feel" is of primary importance, it is desirable that the wall thickness toward the tip end shall progressively decrease as the exterior diameter decreases, or in any event that it shall not increase as compared with the wall thickness at the butt end of the rod. In such rods the tip lightness should be in direct proportion to the dimension of the diameter, and such lightness of tip is particularly desirable on relatively long rods of the fly casting type, since an increase in wall thickness toward the tip will so distribute the metal as to impart a feeling of tip heaviness to the rod in the hands of an expert user. Such considerations, of course, do not apply to certain more rugged types of rod, in which an increase in strength toward the tip end is peculiarly desirable rather than delicacy in the distribution of weight.

Furthermore, it has been found in the testing of fly rods that an increase of the wall thickness in the tip region of the rod has a tendency to throw an unequal load or strain toward the larger and thinner walled end of the tip joint, which is objectionable, in that it results in a piling up of the strain at that point, with the resultant liability of breakage. These considerations are of particular importance in such a light and delicate instrument as a fly rod, although they are of lesser importance in the case of short bait casting rods.

The method of the present invention is designed to conform to the above considerations and to permit the distribution of the metal in ratio to taper to be computed with precision, so that by the use of the present invention fly rods of the utmost delicacy can be manufactured which will have all of the lightness and feel of the finer bamboo casting rods and at the same time will possess greater elements of strength and durability.

The method of the present invention may be practiced with machines or appliances of the character particularly set forth and described in the Barnhart Patent No. 1,711,825, issued May 7, 1929, so that it is not deemed necessary herein to describe the mechanism in detail, although reference is had to the accompanying drawing, wherein,—

Figure 1 is a diagrammatic sectional representation of a tube passing through drawing rollers at the beginning of the drawing operation;

Fig. 2 is a view showing a completed tube in which the drawing operation results in a continuous taper with progressive decrease in wall thickness throughout; and Fig. 3 is a similar view in which the drawing operation results in a tube having uniform taper and uniform wall thickness throughout.

It will be understood that the present drawing is intended merely as diagrams, and that the wall thickness and ratio of length to diameter is diagrammatically indicated rather than illustrated, in order to better bring out the principles of the present invention.

In practicing the method of the present invention, I first start with a tube A of uniform exterior diameter, but tapered on the interior in order to provide a progressively decreasing wall thickness from the prospective butt end of the rod toward the prospective tip end.

For purposes of illustration, it may be assumed that the tube in question, at the thicker end, possesses a wall thickness of .010 in. and at the opposite end a thickness of .005 in., and the initial length of the tube will, of course, be such as to permit of its being drawn to the intended length of a fishing rod or the like of the intended weight in the completed rod or rod section.

The tube in its initial form, having uniform exterior diameter and interior taper, is of a character which is being produced at the present time by tube drawing mills in conformity with well understood principles, but the subsequent drawing of the tube to produce a fishing rod of the character previously described is in conformity with the principles of the present invention.

In the tapering operation now to be described, a tube of uniform diameter and interior taper is introduced between rolls B keyed upon shafts C, each roll being provided with a progressively deepening groove D, the formation of the groove being computed to impart the desired progressive taper to the tube in ratio to the speed of advance of the tube through the rolls. Such taper may be uniform throughout or computed in varying ratio within different portions of the tube, or some portions of the tube may be tapered and other portions uniform, depending upon the depth of the roller groove around different portions of the periphery, in conformity with the principles set forth and described in the Barnhart Patent, No. 1,711,825.

In advancing the tube through the rolls, the tube is drawn forward by a "comealong" or the like, which is operated in timed relation to the rotation of the rolls which preferably rotate in opposite relation to the advance of the tube, as indicated by the arrows in Figure 1, so that the exterior taper imparted to the tube will at all times be determined by the configuration of the roll grooves in ratio to the speed of advance of the tube relatively to the rotation of the rolls.

As the tube advances under the drag of the "comealong," the metal will be drawn back or crowded rearwardly as the tube is elongated, and the wall thickness will be progressively increased during the operation, with the result that after the tube has been drawn into the form of a rod section or the like the desired exterior taper will be secured in conjunction with the desired ratio of wall thickness, so that by starting with an initial wall thickness less than the intended resultant wall thickness in the reduced end of the rod it is possible to build up the wall thickness to the desired degree, which may be less than or equal to the wall thickness at the opposite end of the larger diameter, which latter end may retain its initial wall thickness and diameter in the completed rod. The present process may also, if desired, be employed to provide an increased resultant wall thickness at the end of lesser diameter, although the present invention is designed primarily for use in those cases in which it is desired to decrease the wall thickness concurrently with decrease in exterior diameter.

In Fig. 2 I have diagrammatically indicated a rod section having a resultant wall diameter of .010 in. at the butt end and .007 in. at the tip end; and in Fig. 3 a rod section in which the resultant wall thickness is the same—.010 at each end of the section.

In tapering the tube, beginning at the heavy end, it will be understood that I drag less metal as the taper progresses and the tube is elongated in the tapering process, which fact permits of a redistribution of the metal in such a way as to produce uniform wall thickness throughout, or a thinner wall at the end of smaller diameter as compared with the wall thickness at the end of larger diameter, thereby imparting extreme flexibility and lightness in the tip region.

Another feature of importance in connection with the present invention involves the provision of greater strength at or near the ends of the joint where the ferrules are located and which are the points of increased liability to breakage due to the fact that the rod is made inflexible by the natural stiffness or resistance of the ferrules, which prevent a symmetrical yielding or bending of the rod over its entire length when the rod is under strain. This circumstance indicates that the symmetrical resistance to strains should not be less but preferably more immediately adjacent to the ferrules.

Thus by employment of the present invention, it is found that a tube having a wall thickness of .010 in. at one end may be employed, while formerly, by conventional methods of drawing, it was necessary to employ a tube having a lesser thickness of .007 in., which limitation in the past was due to the fact that the use of a thicker tube would result in an objectionably heavy tip joint as a whole.

By the use of the present invention, a tube which initially varies in wall thickness from .010 in. down to .005 in. may be tapered in such a way that the weight of the section as a whole will, when completed, be no greater than a tube drawn from a tube having an initial wall thickness of .007 in. throughout its entire length. In other words, without increasing the weight of the section as a whole, it is possible to start with a wall thickness of .010 in. at the end of larger diameter where strength is most required, and at the same time secure the desired distribution of wall thickness and weight throughout the entire length of the rod section. This is a very important result, since it is conducive to a proper distribution of resistance to strain either in a fine fly rod or in an extremely light, flexible and long bait casting rod.

Although the invention has been described with particular reference to the requirements of fishing rods, it is not the intention to limit its use thereto, since other tubular products may be drawn and tapered in accordance with the principles of the present invention.

I claim:

1. The method of fabricating a flexible metallic tubular structure, which consists in first producing a tube having a uniform external diameter and tapered on the interior to afford a tapering wall thickness and in thereafter advancing the tube through dies with a resultant elongation and redistribution of the metal to afford an exterior taper by progressive reduction of the exterior diameter toward the end initially having the lesser wall thickness and a progressive increase in wall thickness toward the end whose exterior diameter is being reduced as compared with the initial wall thickness of the corresponding region.

2. The method of fabricating a flexible metallic tubular structure, which consists in first producing a tube having a uniform external diameter and tapered on the interior to afford a tapering wall thickness and in thereafter longitudinally redistributing the metal to elongate the tube and progressively reduce its exterior diameter and correspondingly increase the wall thickness toward the end whose exterior diameter is being reduced as compared with the initial wall thickness of the corresponding region.

3. The method of fabricating a flexible metallic tubular structure, which consists in first producing a tube having a uniform external diameter and tapered on the interior to afford a tapering wall thickness and in thereafter advancing the tube through dies and longitudinally redistributing the metal with resultant elongation of the tube and progressive reduction of its exterior diameter and corresponding increase in wall thickness toward the end whose exterior diameter is being reduced as compared with the initial wall thickness of the corresponding region.

JOHN HEDDON.